Feb. 21, 1939.                M. J. WEINBERG                    2,147,684
                              BUTTER-CHIP MAKER
                           Filed Feb. 21, 1938           2 Sheets-Sheet 1
FIG. 1
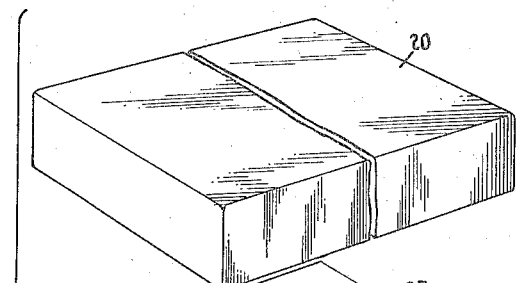
FIG. 2
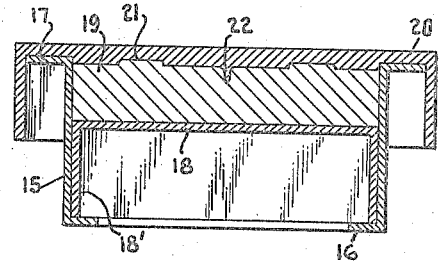
FIG. 3
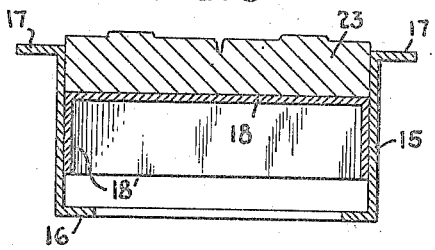
FIG. 4 FIG. 5
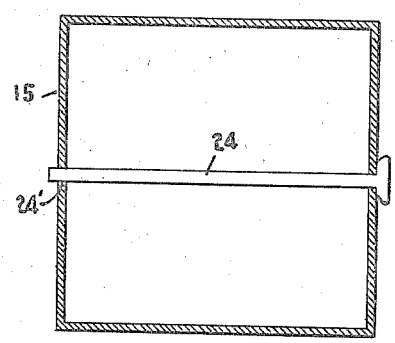
FIG. 6 FIG. 13
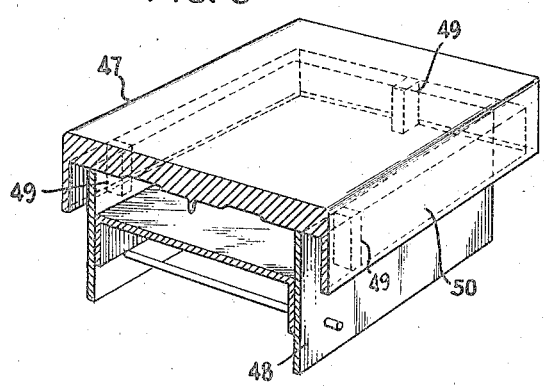
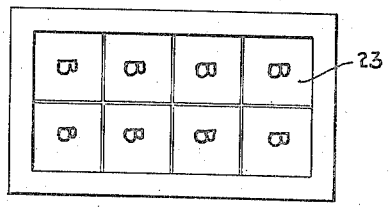
MAURICE J. WEINBERG
INVENTOR
BY *Victor J. Evans & Co.*
ATTORNEYS Feb. 21, 1939.  M. J. WEINBERG  2,147,684
BUTTER-CHIP MAKER
Filed Feb. 21, 1938  2 Sheets-Sheet 2

MAURICE J. WEINBERG
INVENTOR
BY *Victor J. Evans & Co.*
ATTORNEYS

Patented Feb. 21, 1939

2,147,684

UNITED STATES PATENT OFFICE 2,147,684

BUTTER-CHIP MAKER

Maurice J. Weinberg, New York, N. Y.

Application February 21, 1938, Serial No. 191,796

7 Claims. (Cl. 31—42)

The present invention relates to a new and improved butter chip maker.

The primary object of the invention is to provide a device, preferably for home use, that will produce butter in chip form and simultaneously ornament or emboss each formed chip.

A further object is to provide a device of this character that will readily convert into ornamented chips, butter in any form, as from blocks, prints, rolls, bars, butter sticks, slabs and bulk form.

A still further object of the invention is the provision of a butter chip forming and embossing device that includes a chamber for receiving the butter in slab form or converting butter of other forms into slabs and an impresser head associated with the butter chamber and slidably engaged therewith.

Another object of the invention is the provision of a butter chip forming and embossing device that includes a means for varying the size of the chamber in which the butter is positioned for forming and embossing the butter chips.

The invention will be fully and comprehensively understood from a consideration of the following detailed description when read in connection with the accompanying drawings which form part of the application.

In the drawings:

Fig. 1 is an exploded perspective view of the device illustrating the impresser head and butter receiving compartment.

Fig. 2 is a transverse sectional view of the device illustrating the butter in the process of embossing and chip making.

Fig. 3 is a view similar to Fig. 2 with the impresser head removed and the impressed chips being ejected.

Fig. 4 is a sectional view of the device illustrated in Fig. 2 and showing a means of supporting the butter carrying plate.

Fig. 5 is a sectional view taken on line 5—5 of Fig. 4.

Fig. 6 is a sectional view of a modified form of impresser head.

Fig. 13 is a top plan view of the butter chamber and illustrating the chips supported therein after embossing.

Figure 7:
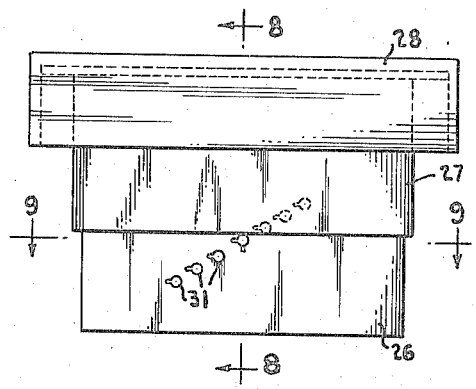
Fig. 7 is a front elevational view of a modified form of the device.

At the present time, obtainment of ornamented butter chips for household use is quite expensive and for that reason butter packed and sold in such form and manner has not reached any degree of popularity. By means of the present invention, it will be possible for butter chips to be formed and embossed in the home from bulk or print butter purchased at the normal price. It is well known that the serving of butter in ornamented chip form is preferable in the home when entertaining and serving formal dinners.

Referring to the drawings for a more detailed description thereof, and particularly Figs. 1 to 5 inclusive, it will be noted that the device includes a substantially rectangular frame 15 having inwardly extending flanges 16 integral therewith forming a base for supporting the frame on a flat surface and also to prevent plate and butter from being ejected from the base portion of said frame. The upper end of the frame 15 may be formed of metal, wood, plastic, or any other material best suited for use with butter.

The frame 15 supports the butter receiving plate 18 the side portions of which closely engage and are slidable with the inner wall of said frame and rest upon the flanges 16. As illustrated in Fig. 2 of the drawings, the space between the top of the plate 18 and the upper flanges 17 forms the chamber for receiving the butter to be embossed, the butter being indicated by the reference numeral 19. It is to be understood that the size of the frame 15 and plate 18 can be varied to accommodate slabs of butter of different sizes. The most practical size would probably be a slab cut from a one-pound package of butter, in which case the length and width of the inner diameter of the butter receiving chamber would be equal to the length and width of the one pound package of butter.

The butter chamber is made variable in size by increasing or decreasing the size of the plate flanges 18', which flanges normally rest upon the base flanges 16.

The impresser head indicated generally by the numeral 20 is of substantially the same shape as the frame 15 and is of a size to fit over the flanges 17 of the frame, as clearly illustrated in Fig. 2 of the drawings. The inner surface of the impresser head 20 carries the embossing means 21 and also is ridged, grooved, or ribbed as indicated at 22 for dividing the slab of butter into a number of equal sized chips. In other words the portion 22 of the impresser scores the butter in such a manner that it can readily be separated along the scored lines after removal from the butter chamber or while still in the chamber. The sectioning of the slab of butter and embossing thereon are clearly illustrated at 23 in Fig. 1 of the drawings.

Due to the inconsistency of butter texture, it is necessary to employ very efficient implements for operation. Butter also possesses great adhesive characteristics, which adhesiveness is intensified against the chamber wall under the pressure applied in embossing. In order, therefore, to release the embossed chips, it is necessary that the horizontal plane of the butter and the horizontal plane of the frame 15 and flange 17 pass each other during ejection operation. To insure this operation, the frame 15 is provided with the flange 16 so that said frame must drop or the plate 18 must rise perpendicularly to operate. If, on the other hand the frame 15 were permitted to rise or the plate 18 to drop the embossed chips would adhere to the frame and thus be injured. As illustrated in Fig. 3 of the drawings, the plate is moved upwardly by pressure exerted within the frame and beneath the plate, which takes place after the impresser head has been removed, it being understood of course, that the butter has previously been scored and impressed by means of the head 20.

It may occasionally be desirable to increase or decrease the depth of the butter chamber to accommodate different thicknesses of butter, and for accomplishing this purpose, there is provided a plurality of openings 24' in the side walls of the frame 15 through which is projected a rod or the like 24. It will be noted by reference to Fig. 4 of the drawings that with this construction, the side walls of the plate 18 rest on the rod 24, and when desiring to increase or decrease the depth of the butter chamber 25, the rod 24 is positioned within the appropriate openings 24'. The impresser head is used in the same manner as previously described and the butter is ejected by urging the plate 18 upwardly so that the embossed chips can be conveniently removed therefrom. The type of rod preferably desired to be used is more fully disclosed in Fig. 5 of the drawings.

As afore-indicated, the frame 15 is provided with integrally projecting flanges 17 which serve to guide the impresser head into position over the frame, whereby said head frictionally engages the flanges when in position. Before the inner surface of the impresser head rests against the flanges 17, a slight pressure downwardly causes the slab of butter positioned within the chamber to become embossed and scored, after which the impresser head is removed and the butter ejected in the manner previously described.

Figure 8:
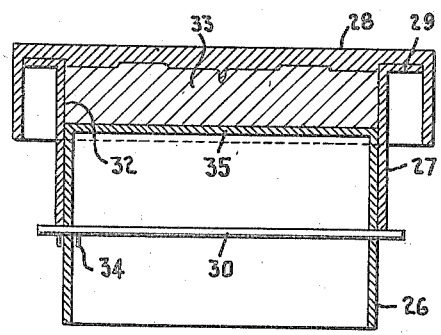
Fig. 8 is a sectional view taken on line 8—8 of Fig. 7.
Figure 9:
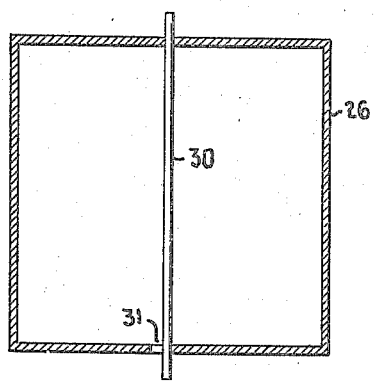
Fig. 9 is a sectional view taken on line 9—9 of Fig. 7.

In Figs. 7, 8 and 9 of the drawings there is disclosed a modified form of the invention which includes a substantially rectangular shaped block 26, frame 27 and impresser head 28. In this form of the invention it will be noted that the frame 27 is also provided with outwardly extending flanges 29 and said frame is adjustably supported relative to the block 26 by means of the rod 30 extending through aligned apertures in opposite sides of said block.

A series of apertures 31 are provided in each side wall of the block whereby the position of the frame 27 can be adjusted to increase or decrease the depth of the butter chamber 32 in which is supported the slab of butter 33. Lips 34 are formed on the rod 30 to lock the same in position.

It will be noted that this modified form of the invention differs from that previously described in that the frame 27 is dropped in order to remove the embossed chips. In order to drop the frame, it is of course necessary to remove the rod 30 from its apertures 31, whereupon the top surface of the flanges 29 will be substantially on or below a plane with the plate portion 35 of the block 26. It is understood that decreasing the depth of the butter chamber 32 increases the number of chips to be obtained from, for example, one pound of butter, and, on the contrary, increasing the depth of the butter chamber reduces the number of chips to be obtained from a pound of butter.

Figure 10:
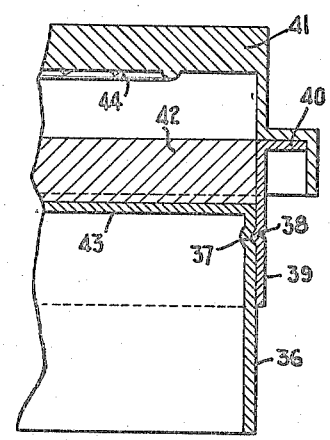
Fig. 10 is a fragmentary sectional view of a further modified form of the invention.

In Fig. 10 of the drawings there is disclosed a further modified form of the invention in which the block 36 is grooved at 37 for receiving the rib 38 forming a part of the frame 29. As in the previously described forms, the frame 39 is provided with the guiding flanges 40 on which rests and is guided the impresser head 41. In the position illustrated, the slab of butter 42 is positioned on the plate 43 of block 36 and the impresser head then moved downwardly into position. Exerting pressure on the head 41 forces the frame 39 to move downwardly until the inner surface 44 of the head 41 contacts and embosses the butter. The rib 38 within the groove 37 retains the frame in proper relation with the block 36 for positioning the slab of butter. After embossing, the head 49 is removed to permit removal of the butter chips from the plate 43. It is to be understood that the frame 39 and block 36 are frictionally held in sliding relation.

Figure 11:
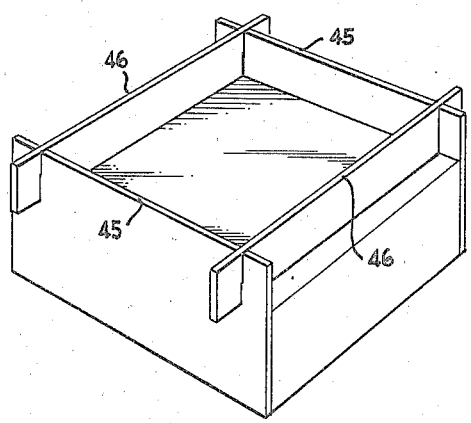
Fig. 11 is a perspective view of one type of butter receiving chamber.

If desired, the butter chamber in any of the described forms may have fixed flanges projecting above the surface around the periphery creating a fixed butter chamber or, two fixed flanges on opposite sides with slots at each end thereof for receiving a pair of removable plates which completes the butter chamber. This type is illustrated in Fig. 11 of the drawings, in which the numeral 45 represents the fixed flanges and 46 the removable plates. When this type of chamber is used in conjunction with the impresser head, an auxiliary device, not shown, will be employed for causing the removal of the embossed butter.

In Fig. 6 there is disclosed a still further modified form of the invention in which the top outwardly projecting flanges forming a part of the frame are dispensed with, and, in order to guide the impresser head 47 into position on the frame 48, ribs 49 are provided forming an integral part of the side portions 50 of said head. It is preferably desired that one rib be positioned on each side of the head and likewise one rib positioned at each end. This permits the impresser head to be properly disposed over the butter chamber and in correct position for embossing and scoring the butter in the manner previously described.

Figure 12:
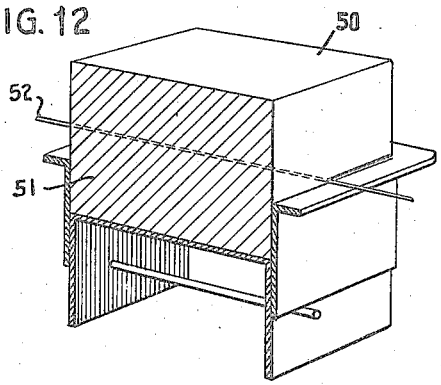
Fig. 12 is a partial sectional view illustrating one means of cutting butter from bulk or print form to fit the butter receiving chamber.

In Fig. 12 of the drawings there is illustrated a means of cutting bulk or print butter into slab form. It will be noted that butter in bulk or print form illustrated by the reference character 50 has been positioned within the butter chamber and the portion 51 of the butter resting within the chamber is sliced off by means of a wire cutter or the like 52. This manner of slicing butter is preferred when slab form butter of proper size is not obtainable.

From the above description it will be apparent that there is provided a device which will produce for home consummation, by a simple hand process, ornamented butter chips of various dimensions and weight. It has been pointed out wherein chips can be converted from butter of any form in an easy and convenient manner.

It is also to be understood that a device of the type described may also be employed for other food products such as cream cheese and other impressible cheese, candy, ice cream, gelatin and pastes and the like, or in fact for any food products of a body and texture which will lend themselves to the device and operation herein described.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described, and, therefore, such changes and modifications may be made therein as do not affect the spirit of the invention nor exceed the scope thereof as expressed in the appended claims.

What is claimed is:

1. A device of the character described, comprising a substantially rectangular block, a substantially rectangular frame disposed over said block, said block having a groove in the side walls thereof for receiving a rib formed in said frame, an impresser head and means for guiding said head into position over said frame whereby when pressure is applied to the head the rib is removed from the groove.

2. A device of the character described comprising a frame, a second frame slidably engaging the walls of the first frame, means adjustably supporting said second frame in varying position relative to the first frame, said second frame forming with an upper portion of the first frame a receiving chamber for a slab of butter, a closure for said chamber slidably mounted externally of said second frame, said closure having side members spaced from said second frame, and means on one surface of said closure adapted to engage a surface of said slab of butter for forming an impression thereon.

3. A device of the character described comprising a frame, a second frame slidably engaging the walls of the first frame, said second frame forming with an upper portion of the first frame a receiving chamber for a slab of butter, a closure for said chamber slidably mounted externally of said second frame, said closure having side members spaced from said second frame to provide means for disengaging said closure from said frame, and means on one surface of said closure adapted to engage a surface of said slab of butter for forming an impression thereon and simultaneously forming longitudinal and transverse cuts across said slab of butter.

4. A device of the character described comprising a frame, a second frame slidably engaging the walls of the first frame, said second frame having inwardly extending flanges on one end thereof for supporting the first mentioned frame and outwardly extending flanges on the opposite end thereof for supporting a closure and impresser means, said second frame forming with an upper portion of the first frame a receiving chamber for a slab of butter, a closure for said chamber slidably mounted externally of said second frame, and means on one surface of said closure adapted to engage a surface of said slab of butter for forming an impression thereon.

5. A device of the character described comprising a frame, a second frame slidably engaging the walls of the first frame, said first frame having a series of aligned apertures in opposite sides thereof for receiving a member whereby said second frame is adjustably supported in varying position relative to the first frame, said second frame having outwardly extending flanges and forming with an upper portion of the first frame a receiving chamber for a slab of butter, a closure for said chamber slidably mounted externally of said flanges, and means on one surface of said closure adapted to engage a surface of said slab of butter for forming an impression thereon.

6. A device of the character described comprising a frame, a second frame slidably engaging the walls of the first frame, means adjustably supporting said second frame in varying position relative to the first frame, said second frame forming with an upper portion of the first frame a receiving chamber for a slab of butter, a closure for said chamber, said closure being formed with spaced internally extending ribs for guiding said closure externally of said second frame, and means on one surface of said closure adapted to engage a surface of said slab of butter for forming an impression thereon.

7. A device of the character described comprising a frame, a second frame slidably engaging the walls of the first frame, means adjustably supporting said second frame in varying position relative to the first frame, said second frame having outwardly extending flanges and forming with an upper portion of the first frame a receiving chamber for a slab of butter, a closure for said chamber slidably mounted externally of said flanges, and means on one surface of said closure adapted to engage a surface of said slab of butter for forming an impression thereon and simultaneously forming longitudinal and transverse cuts across said slab of butter.

MAURICE J. WEINBERG.